United States Patent [19]
Zhao et al.

[11] Patent Number: 6,141,753
[45] Date of Patent: Oct. 31, 2000

[54] SECURE DISTRIBUTION OF DIGITAL REPRESENTATIONS

[75] Inventors: Jian Zhao, Providence, R.I.; Eckhard Koch, Bensheim, Germany; Makoto Saito, Tama, Japan

[73] Assignees: Fraunhofer Gesellschaft, Germany; Mitsubishi Corporation, Japan

[21] Appl. No.: 09/021,339

[22] Filed: Feb. 10, 1998

[51] Int. Cl.$^7$ .................................................. H04N 17/00
[52] U.S. Cl. ..................... 713/176; 713/161; 713/168; 380/28; 380/277; 380/278
[58] Field of Search .............................. 380/28, 277, 278, 380/281, 283; 705/161, 168, 170, 176, 193, 201; 713/176

[56] References Cited

U.S. PATENT DOCUMENTS

| | | | |
|---|---|---|---|
| 5,606,609 | 2/1997 | Houser et al. | 380/4 |
| 5,664,018 | 9/1997 | Leighton | 380/54 |
| 5,822,432 | 10/1998 | Moskowitz et al. | 380/28 |
| 5,905,800 | 5/1999 | Moskowitz et al. | 380/28 |
| 6,002,772 | 12/1999 | Saito | 380/49 |

OTHER PUBLICATIONS

Text of PCT/DE 96/01057 Patent, described by attached Derwent Information.

Zhao, J., *Look, It's Not There*, Reprint from Byte Magazine, Jan. 1997.

Fraunhofer Center for Research in Computer Graphics, News Release, *Fraunhofer IGD & CRCG announce SysCoP 1.0 Digital Watermarking Software*.

Arnold, M., *Why watermarking?*, last update Nov. 12, 1997 http://syscop.igd.fhg.de/watermarking info.shtm.

Zhao, J., Koch, E., *A Digital Watermarking System for Multimedia Copyright Protection*.

Koch, E., Rindfrey, J., Zhao, J., *Copyright Protection for Multimedia Data*, pp. 203–213, Digital Media and Electronic Publishing ISBN 0–12–227756–2, Copyright ©1996 Academic Press Ltd.

Koch, E., Zhao, J., *Towards Robust and Hidden Image Copyright Labeling*, pp. 1–4, Proc. of 1995 IEEE Workshop on Nonlinear Signal and Image Processing (Neos Marmaras, Greece, Jun. 1995).

Zhao, J., *Applying Digital Watermarking Techniques to Online Multimedia Commerce*, Proc. of the International Conference on Imaging Science, systems, and Applications (CISSA97), Jun. 30–Jul. 3, 1997, Las Vegas, USA.

Zhao, J., *Watermarking by numbers*, Nature, vol. 384, p. 514, Dec. 12, 1996.

(List continued on next page.)

*Primary Examiner*—Thomas R. Peeso
*Attorney, Agent, or Firm*—Gordon E. Nelson

[57] ABSTRACT

Techniques for secure distribution of digital representations that combine encryption and watermarking. When a user at a client desires to download a digital representation, the user makes a request to a server for the digital representation, which encrypts the digital representation using a first key and downloads the encrypted digital representation to the user. Before the user performs any operation on the decrypted digital representation, a secret fingerprint watermark identifying the user is added to the digital representation. The fingerprint watermark is added either at the server or at the client and a copy of the fingerprinted digital representation is kept at the server. If the user makes an impermissible use of the digital representation, the secret fingerprint watermark can be used to identify the user. The request made by the user indicates the type of use that the user wished to make of the digital representation. If the use involves storage of the digital representation at the client, the server provides a second key that the client employs to encrypt the digital representation. If the user has permission to do so, the user may modify the digital representation and return the modified digital representation to the server for further distribution. In this case, the second key is used to encrypt the digital representation when it is sent to the server. The second key also serves as the user identification in the fingerprint watermark. If the user loses the second key, it can be recovered from the copy of the fingerprinted digital representation kept at the server. The first and second keys and any decrypted copy of the digital representation are kept in secure storage in the client.

31 Claims, 3 Drawing Sheets

OTHER PUBLICATIONS

Zhao, J., *A WWW Service to Embed and Prove Digital Copyright Watermarks*, Proc. of the European Conference on Multimedia Applications, Services and Techniques, Louvain–La–Nueve, Belgium, May. 1996.

"Adaptive Optimization of AG and SAG Mill Circuits Using Intelligent Process Control Software" Lynn B. Hales and Randy A. Ynchausti, EIMCO Process Equipment Company, Salt Lake City, UT—Nov. 1995.

"A Model–Based Approach for Plant–Wide Monitoring, Control and Diagnosis", Karsai, Sztipanovits, et al.—Vanderbilt University, Nashville, TN Miyasaka and Okuda—Osaka Gas Company, Osaka, Japan DeCaria and Lopez—E.I. Dupont De Nemours, Old Hickory, TN 1990.

"Application of Knowledge Based Systems Technology to Triple Quadrupole Mass Spectrometry (TQMS)" Hal R. Brand and Carla M. Wong—Lawrence Livermore National Laboratory, Livermore, CA—1986.

"Design Kit: An Object–Oriented Environment for Process Engineering", G. Stephanopoulos, et al., Laboratory for Intelligent Systems in Process Engineering, MIT, Cambridge, MA *Comput. Chem. Engng.* vol. 6, pp. 655–674 (1987).

"Design of an Expert Control System for Thickeners", M. Nelson, R. Klepper and K. Gritton EIMCO Process Equipment Company, Salt Lake City, UT (presented at SME '97, Denver, CO, Feb. 27, 1997).

"Intelligent Enterprise–wide Adaptive Optimizing Control", K. Gritton, R. Ynchausti and L. Hales EIMCO Process Equipment Company, Salt Lake City, UT 1996.

"Intelligent Monitoring and Diagnostics for Plant Automation", J. Sztipanovits, G. Karsai, S. Padalkar, C. Biegl—Vanderbilt, University, Nashville, TN N. Miyasaka, K. Okuda, Osaga Gas Company, Osaka, Japan.

"Plant–Wide Supervisory Expert Control", R. Ynchausti, J. McKay and L. Hales EIMCO Process Equipment Company, Salt Lake City, UT, pp. 1249–1261 1996.

"Three Dimensional Parametric Analysis Integrated with a Solid Modeling System", Robert W. Colby Brigham Young University, Salt Lake City, UT Presented to the Department of Mechanical Engineering—Nov. 29, 1994.

Fig. 1

Watermarked original
representation 121

201 Representation 121 after
Modification

207 Representation 121 in
client 119

SECURE DISTRIBUTION OF DIGITAL REPRESENTATIONS

BACKGROUND OF THE INVENTION

1. Field of the Invention

The invention concerns prevention of illegal copying generally and more specifically concerns the use of encryption and watermarking to prevent such copying.

2. Description of Related Art

Increasingly, works of authorship of the kinds protected by copyright are being encoded into digital representations and distributed in the digital representations. An example of such a digital representation is the one used for audio recorded on a compact disk. There are many advantages to digital representations: they can be made as faithful as desired to the original, they can be copied easily and precisely, they can be easily modified, and they can be easily decoded, and once decoded, they can be played, displayed, or printed. The copying, modification, and decoding can be done in any device which includes a microprocessor and memory, and the digital representations can be distributed by any of the techniques used to distribute digital data, including networks and storage devices such as diskettes, tapes, and CD-ROMs.

The extreme ease, rapidity, and precision with which digital representations can be copied and the ease and rapidity with which they can be distributed poses serious problems for authors. Digital representations of works are subject to the copyright law like any other representations, but there is serious concern that copying of digital representations of works will outpace the ability of the copyright law to prevent it. In response to this concern, a number of ways have been found of using technology to make illegal copying of digital representations more difficult. These ways fall into four main categories:

Controlling access to a digital representation so that those who do not have the author's permission do not have access to it;

Controlling the uses that a person who has access to the digital representation may make of it;

Encrypting the digital representation while it is being transmitted across the network and while it is stored on a storage medium or in memory, with decryption being possible only for an authorized person; and watermarking the digital representation, that is, providing it with markings that are invisible or inaudible when the digital representation is decoded and displayed or played but which may be read by machine. The markings indicate the source of the work.

The first three categories all have a common aim: to keep the digital representation of a work out of the hands of an unauthorized person. The techniques of these three categories are of no help once the digital representation "escapes", that is, falls into the hands of an unauthorized person in unencrypted form, since the unauthorized person can use the full panoply of digital methods to copy and distribute the escaped digital representation.

The watermarking technique of the fourth category does not interfere with copying, but does make it possible to determine the original source of the digital representation from the copy and therefore makes it easier to detect infringing copies and to determine their source. A general discussion of the problem of copyright protection for digital representations may be found in Eckhard Koch, Jochen Rindfrey, and Jian Zhao, "Copyright Protection for Multimedia Data", in: *Digital Media and Electronic Publishing*, Academic Press Ltd., 1996.

An example of a system for controlling copying that uses the first three techniques can be found in U.S. Pat. No. 5,646,999, Saito, *Data Copyright Management Method*, issued Jul. 8, 1997, which is incorporated herein by reference. A general discussion of watermarking may be found in Jian Zhao, "Look, It's Not There", in: *BYTE Magazine*, January, 1997.

While each of the categories of techniques for discouraging illegal copying has its strengths, each has its weaknesses. As indicated above, the techniques for keeping copies out of the hands of unauthorized persons are of no help once a digital representation escapes; watermarking by itself cannot hinder illegal copies from being made. What is needed is an improved technique for preventing illegal copying which combines the strengths of the techniques for keeping copies out of the hands of unauthorized persons and the watermarking techniques.

SUMMARY OF THE INVENTION

The technique of the invention for securely distributing copies of digital representations ensures that a secret watermark identifying the person to whom the copy was distributed is added to the copy before the user operates on the copy. In particular, the watermark is added before the user stores the copy in local storage. The secret watermark may be added to the document either by the system from which the copy is distributed before the copy is distributed or by the manipulator that the user uses to operate on the copy after he or she has received it. If the digital representation is made up of a number of digital representations, the secret watermark is added to each.

The copy is encrypted with a first key before it is distributed and encrypted again with a second key before it is stored in local storage. The second key may also serve to identify the user, and when that is the case, it is used to identify the user in the secret watermark. In order to provide for key recovery, another copy that has the secret watermark but is not encrypted with the second key is maintained in the system from which the copy is distributed. If the user loses the second key, it can be recovered from the copy with the watermark.

The decrypted copy and the keys needed to decrypt the downloaded copy and reencrypt and decrypt the stored copy are stored in a protected area in the system to which the manipulator belongs and are not accessible to the user. The manipulator may be implemented as a plug-in for a browser, and when that is the case, the watermarker may be downloaded with the downloaded copy and deleted as soon as the secret watermark has been applied to the copy.

The foregoing objects and advantages of the invention will be apparent to those skilled in the arts to which the invention pertains upon perusal of the following Detailed Description and drawing, wherein:

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description begins with an overview of a system in which the invention is implemented, then describes how the system is used to prevent illegal copying, and finally provides details of the watermarking and encryption techniques used in the preferred environment.

Figure 1:
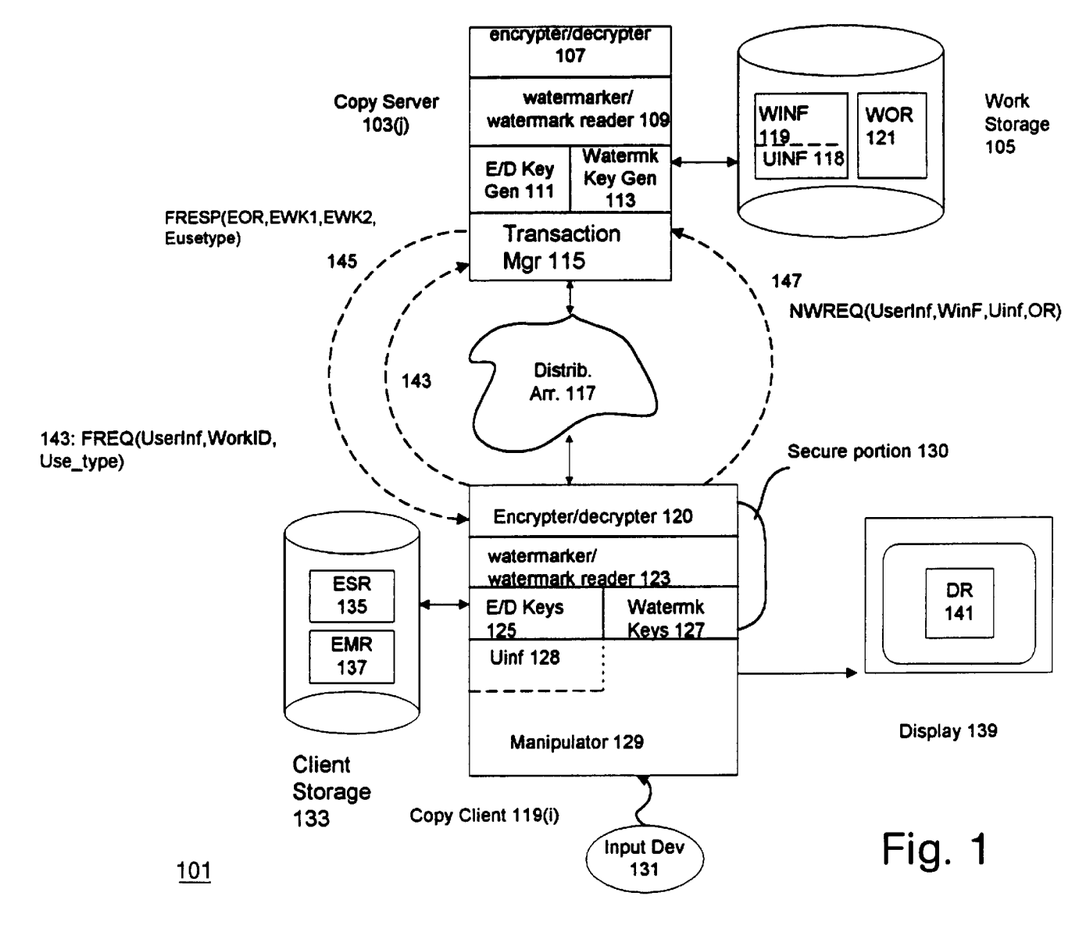
FIG. 1 is a detailed block diagram of a system incorporating the invention.

Overview of Copy Protection System 101: FIG. 1

FIG. 1 shows a system 101 which is used to prevent illegal copying of digital representations that are distributed via a distribution arrangement 117. Distribution arrangement 117 may be any kind of arrangement for distributing digital representations of works to users. In the preferred embodiment, distribution arrangement 117 is the Internet, but it may be any kind of network. Within the network, any available technique or combinations of techniques may be used to transfer the digital representations. In other embodiments, distribution arrangement 117 may consist in whole or in part of a system which distributes physical objects containing the digital representations.

Distribution arrangement 117 transfers digital representations of works between one or more copy servers 103 and one or more copy clients 119. FIG. 1 shows an exemplary copy server 103(*j*) and an exemplary copy client 119(*i*). In the preferred embodiment, copy server 103(*j*) is implemented in software running in a World Wide Web server and copy client 119(*i*) is implemented in software running in a computer such as a PC or workstation which is capable of being connected to the Internet and therefore capable of accessing copy server 103(*j*). The dotted lines in FIG. 1 show the flow of information between client 119(*i*) and server 103(*j*) when client 119(*i*) is requesting digital representations from or providing digital representations to copy server 103(*j*).

Figure 2:
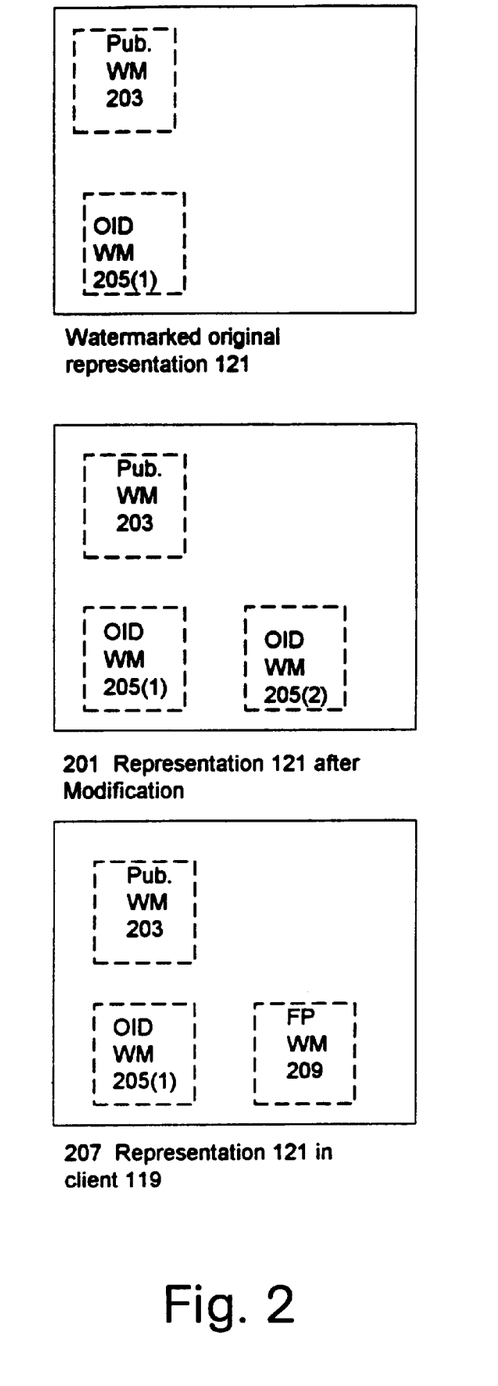
FIG. 2 shows details of watermarking in works.

Beginning with copy server 103(*j*), copy server 103(*j*) includes work storage 105 which contains a collection of watermarked original representations (WOR) 121. Each of these is a digital representation of a work which is distributed from copy server 103(*j*). If copy server 103(*j*) is secure, the representations in work storage 105 need not be encrypted; if it is not, representations should be encrypted whenever they are stored in work storage 105. When copy server 103(*j*) receives an original digital representation from an author, it uses information it has about the author to watermark the work. FIG. 2 shows a detail of the watermarking of watermarked original representation 121 in a preferred embodiment. There are two kinds of watermarks: a public watermark 203 and one or more secret watermarks 205. Public watermark 203 is used for information which should be accessible to all users of the representation. It will include at a minimum the copyright notice for the representation and may include other information such as ordering information. The information for public watermark 203 is at standard locations in all original representations 121, and can thus be read by any watermark reader.

Because the information for the public watermark is at standard locations, it can be removed from representation 121 by an illegal copyist. This problem is solved by the inclusion of secret owner identification watermark (OIDWM) 205, which identifies the owner (or author) of the work. Secret watermark OIDWM 205 is produced using a secret key and can only be read by watermark readers that have the key. There may be more than one secret watermark OIDWM 205 in a watermarked original representation 121 because the original representation may be a derivative work, that is, a work by one author that was modified by another, or a collective work, that is, a work that is made up of contributions by several authors. In such situations, each of the authors (or owners) involved will have his or her own OIDWM 205 in the watermarked original representation.

Returning to FIG. 1, associated with each watermarked original representation in work storage 105 is work information 119. Work information 119 contains information about the work, for example, licensing information and directions for payment to the author. In the present context, use information 118 in work information 119 is particularly important. Use information 118 indicates how the digital representation may be used—whether it can be decoded and displayed, played, or printed, whether a copy of the digital representation may be made, whether the digital representation may be modified, whether it may be incorporated into another work, and so forth. Of course, the use information may be correlated with the licensing information: for example, a license to display the work may have one price, a license to print it may have another, perhaps based on the number of copies printed, and a license to modify the work will have still another. In the case of the license to modify, the price of a license to modify may depend on whether the modification is for private use or is intended to be a published work in its own right.

The components of copy server 103(*j*) further include encrypter/decrypter 107, for encrypting and decrypting representations 121 and keys, watermarker/watermark reader 109 for making and reading watermarks in representations 121, key generator 111 for generating and storing keys for encrypting and decrypting representations 121, watermark keys 113 for generating and storing the keys used to make secret watermarks such as watermark 205, and transaction manager 115, for managing transactions with copy clients 119(*i*). All of these components may be implemented in software or in combinations of hardware and software. In particular, encypter/decrypter 107, watermarker/watermark reader 109, and key generators 111 and 113 may be implemented using special-purpose hardware, both to ensure efficiency in performing these specialized operations and to ensure that the keys involved are generated, stored, and used in a secure environment.

Copy client 119(*i*) performs many of the same operations as server 103(*i*) and has many analogous components. Client storage 133 contains encrypted and watermarked copies 135 and modified copies 137 of digital representations received from copy servers 103 via distribution arrangement 117. Input device 131 may include a keyboard and a mouse or other pointing device. It is used to provide inputs from a user of copy client 119(*i*) to copy client 119(*i*). Display 139 operates under control of copy client 119(*i*) and provides displays 141 made by decoding copied digital representations and of a graphical user interface for copy Client 119(*i*). Display 139 may of course also provide audio output from digital representations of audio originals that are decoded from the copied digital representations. Copy client may also have other display devices, for example, printers, that decode the copied digital representations. Decoding may of course also be done in copy client 119(*i*), which would then supply the display and/or audio devices with the decoded work.

Other components include encrypter/decrypter 121, which encrypts and decrypts digital representations and keys, watermarker/watermark reader 123, which makes and reads watermarks in digital representations received in or produced by copy client 119(*i*), key storage 125 for encryption/decryption keys, key storage 127 for keys used in making and reading secret watermarks, use information 129, which indicates the uses to which the digital representations being displayed in display 139 or stored in client storage 133 may be put, and manipulator 129, which fetches digital representations from and returns them to copy servers 103, provides the decrypted digital representation to a display device or printer for decoding, and modifies the digital representations as determined by use information 129 when they are in client 119(*i*). In some embodiments, there may only be a watermark reader 123 and watermark keys 127 may include only a key for public watermarks. A copy client 119 that was limited to downloading digital representations for decoding would also only require a decrypter in encrypter/decrypter 107.

While it may be possible to ensure the security of copy server 103(*j*) by means of techniques such as physical security of the premises in which server 103(*j*) is located and firewalls against intrusion, copy client 119(*i*) is implemented in ordinary PCs and workstations, and no assumptions whatever can be made about the security of the environment in which the machines exist. One consequence of the general insecurity of the environment of copy client 119(*i*) is that the digital representations are always stored in encrypted form in client storage 133. Another is that encrypter/decrypter 120, watermarker/watermark reader 123, keys 125, keys 127, and use information 128, together with the unencrypted copy of the representation that is in main memory and that is decoded to produce displayed representation 141, must all be in a secure portion 130 of the PC or workstation on which copy client 119(*i*) is implemented. The contents of secure portion 130 are not accessible by application programs running in the PC or workstation, and manipulator 129, which is an application program, cannot directly access the components in secure portion 130 but can only exchange data with them. Secure portion 130 may be implemented using secure resources provided by the operating system for the PC or workstation, or it may be implemented using special hardware such as a secure coprocessor that stores keys, does the encryption and decryption and watermarking and watermark reading, stores the decrypted copy of the representation being manipulated, and outputs the decrypted copy directly to memory used by whatever device decodes the decrypted copy. In the PC environment, the secure coprocessor may be implemented as a module that interfaces to the PCMCIA bus. Other implementations may combine hardware components with secure components provided by the operating systems. For details on secure coprocessors generally, see Bennet Yee and J. D. Tygar, "Secure Coprocessors in Electronic Commerce Applications", which can be found at http://www.usenix.org/publications/library/proceedings/ec95/yee.html Operation of System 101

System 101 has two functions: to receive original digital representations for storage in copy server 103(*j*) and to distribute copies of these digital representations to authorized users. Beginning with the first function, an original digital representation can come from any source, but will often come from a copy client 119(*i*), either because a user of the client has made a completely new work or has made a derivative work using one or more representations that he or she previously received from copy server 103(*j*). The following discussion will first describe how copy server 103(*j*) receives an original digital representation for storage and will then describe how copy server 103(*j*) distributes digital representations.

Receiving Original Digital Representations

When an author provides an original digital representation of a work to copy server 103, the digital representation (OR) must be accompanied by the information shown at NWREQ 147, namely, information that identifies the author or owner (USERINF) and the work (WINF), and information that specifies how the digital representation is to be licensed (UINF). The latter information may include a list of those who are to be given access and indications of the kinds of uses they may make of the digital representation. While the digital representation and the information may be sent in the clear, it is generally preferable that it be sent in encrypted form. The key used to encrypt the digital representation and the data may be a public key for copy server 103(*j*) or it may be a symmetric key which copy server 103(*j*) has previously provided to copy client 119(*i*) for use when storing a digital representation or for the specific purpose of encrypting a digital representation to be sent to copy server 103(*j*).

In all cases, when copy server 103(*j*) receives the original digital representation, it decrypts it if that is necessary, stores the decrypted information accompanying the work in WINF 119, and then uses watermarker 109 to watermark the original digital representation. The watermarks will include public watermark 203 and a secret watermark 205 indicating the author or owner of the original digital representation. The secret watermark will be made with a watermark key provided by watermark key generator 113. The new watermarking will not affect any watermarks already on the original digital representation. The original digital representation would of course already have such watermarks if it were a derivative work. If security requires it, copy server 103(*j*) will encrypt the original digital representation before storing it in work storage 105.

Distributing Original Representations

Distribution of a copy of an original digital representation begins with a request from copy client 119(*i*) as shown at dashed line 143. A user of copy client 119(*i*) causes the request to be transmitted by inputting information via input device 131 and the copy client graphical user interface displayed in display 139. The request FREQ includes the following information: USERINF identifying the user making the request, WORKID identifying the work being sought, and USE_TYPE, specifying the kind of use the user making the request wishes to make of the original digital representation. Example kinds of use are simply decoding the digital representation for display, playing, or printing, making a local copy of the digital representation, and making a derivative work from the digital representation. If copy server 103(*j*) does not already have a copy of the user's public key, FREQ may include that as well.

Copy server 103(*j*) responds to request 143 by first determining from WINF 119 whether the user can access the desired digital representation 121 at all, and if the user can, whether the use type specified by the user is one that is permitted for the user. If it is, copy server 103(*j*) does whatever bookkeeping is required as a result of the request (bookkeeping may range at least from a simple indication that the work was copied through a billing transaction for the request to a licensing transaction) and then generates one or two symmetrical encryption keys for the digital representation 121. It generates one key if the user merely wishes to decode the digital representation for display, playing, or printing. If the user wishes to make a local copy for repeated decoding or in order to edit the digital representation, it generates two keys, one for encrypting the digital representation when it is sent to copy client 119(*i*) and one for reencrypting the digital representation when it is stored in copy client 119(*i*).

In some embodiments of system 101, watermarker 109 may add a secret fingerprint watermark to decrypted digital representation 121 before it is encrypted and sent to copy client 119(i). The fingerprint watermark identifies the user to whom the copy is being sent. To do so, it uses a key associated with the user or any other information which uniquely identifies the user. Digital representation 121 is then reencrypted using the first encryption key. Next, the keys and use information defining what use the user can make of the digital representation are encrypted with the user's public key. Finally, the encrypted digital representation (EOR), the encrypted keys, and the encrypted use information are sent to copy client 119(i).

The second encryption key may be unique enough to serve as an identifier of the user to whom the copy is being sent. When that is the case, the second encryption key may be used as the identifying information in the fingerprint watermark. If a copy of the digital representation with the fingerprint watermark is stored in work storage 105 in association with the user's name, the second encryption key contained in the fingerprint watermark in the stored copy may be used for key recovery. That is, if the user loses his or her copy of the second encryption key, he or she can request that server 103(j) recover the key. Server 103(j) will then locate a copy of the digital representation associated with the user in work storage 105 and use watermarker 109 to read the fingerprint watermark and thereby recover the key. Having recovered the key, server 103(j) can encrypt it with the user's public key and send it to the user. An advantage of this technique is that every digital representation which is reencrypted by the user has a copy in work storage 105 which is not encrypted with the second key but which has the second key embedded in its watermark. The availability of many copies reduces the probability that the second key will be completely lost; on the other hand, the copies are secure, since they can be read solely by the watermarker.

It should also be noted here that above technique is a particular application of a general principle: that a key embedded in a secret watermark can be used for key recovery in any case where the document with the secret watermark need not be decrypted using the embedded key. The technique could for example also be used to recover a user's private key. Every digital representation sent by the user to another person could have a secret watermark with the user's private key embedded in it, and thus any digital representation sent by the user to another person could be sent to a key recovery center and used there to recover the key. The technique's security is improved if the watermarks are made with a public key for the key recovery center's watermark reader and read using the corresponding private key for the watermark reader.

In copy client 119(i), manipulator 129 receives FRESP 145 and uses the user's private key from keys 125 to decrypt the encryption/decryption keys and the use information. The decrypted keys are stored in keys 125 and the use information is stored at UINF 128. Manipulator 129 then begins performing operations on the original work in response to inputs from the user. Before performing each operation, manipulator 129 checks the use information to determine whether it is permitted to that user. If the operation involves a display of the digital representation, manipulator 129 causes encrypter/decrypter 120 to use the first key to decrypt the encrypted original digital representation 121. Decrypted original digital representation 207 may be seen in FIG. 2. As shown there, it includes not only public watermark 203 and secret owner identifier watermark 205(1), but also fingerprint watermark 209. Fingerprint watermark 209 remains in representation 121 at least as long as it is present in any form in client 119(i).

Once the original digital representation 121 is decrypted, watermark reader 123 reads public watermark 203. Manipulator 129 then uses the decrypted digital representation to produce a display of the work 141 in display 139. At the beginning of the display, manipulator 129 displays the contents of public watermark 203. If an input from the user of copy client 119(i) specifies an operation to manipulator 129 which requires that a local copy be made of digital representation 121 and use information 128 permits the operation, manipulator 129 causes encrypter 120 to use encrypter/decrypter 120 to reencrypt digital representation 121. For the reencryption, encrypter 120 uses the second key provided by copy server 103(j). If the user has the right to edit the local copy and does so, manipulator 129 causes encrypter 120 to reencrypt the modified digital representation 121 each time it is saved. If the user wishes to distribute the modified digital representation to others, he or she uses manipulator 129 to send the reencrypted modified digital representation to copy server 103(j) as described above and copy server 103(j) stores the encrypted modified digital representation in storage 105. Manipulator 129 uses copy server 103(j)'s public key to encrypt the key used to reencrypt the modified digital representation and sends the encrypted key to copy server 103(j). In other embodiments, copy server 103(j) may maintain a database of transactions, user identifiers, and keys and will use the user identifier and a transaction identifier to locate the reencryption key that was downloaded to copy client 119(i) with the digital representation.

In a preferred embodiment, the encrypted modified digital representation is distributed to the next user with the key with which it was encrypted by the person who made the encrypted modified digital representation and with a new key for use when the encrypted modified digital representation is reencrypted by the user. Since large numbers of watermarks degrade the quality of the digital representation, copy server 103(j) in a preferred embodiment removes all but the two most recent fingerprint watermarks when it stores the revised digital representation in work storage 105.

In the embodiment just described, copy server 103(j) places the fingerprint watermark in the copy of the digital representation before sending the copy to client 119(i). One advantage of this procedure is that the keys used to make the secret watermarks are retained in copy server 103(j), which is more secure than copy client 119(i). Another is that a copy of the digital representation with the fingerprint watermark is easily stored in work storage 105 for use when it is necessary to recover the reencryption key. The disadvantage is that watermarking is a computationally intensive procedure, and if copy server 103(j) adds the fingerprint watermark, it must do so for every copy it distributes, resulting in a distribution rate that is substantially slower than it would be if server 103(j) did not have to add the fingerprint watermark.

Another way of doing the fingerprint watermarking is to have watermarker 123 in copy client 119(i) add the fingerprint watermark immediately after the encrypted digital representation has been decrypted by decrypter 120. If a copy of the digital representation with the fingerprint watermark is to be saved in work storage 105, the copy can be reencrypted with the first key and returned to server 103(j), where it would be stored as previously described. Having watermarker 123 do the fingerprint watermarking removes the burden of watermarking from server 103(j) and places it on client 119(*i*), which of course receives only a few of the copies that server 103(*j*) distributes and which furthermore need only run at a rate which is determined by the speed of the user of manipulator 129. The difficulty with doing it this way is that the key for the fingerprint watermark must be protected. This fingerprinting key must be available when infringement is detected, and consequently cannot be a key that is used once and then discarded, as for example the key used to encrypt a digital representation that is being distributed can be. If the fingerprinting key becomes known, it can be used by an illegal copyist to locate the fingerprint watermark and then erase it, which effectively covers the copyist's tracks.

One solution to the problem is to include the fingerprinting key in encrypted form with the encrypted digital representation. Decrypter 120 can then decrypt the fingerprinting key and store it in watermark keys 127 for use by watermarker 123. A simple way to do this is to encrypt the fingerprinting key with the same key used to encrypt the digital representation. Another solution to the problem is to make the fingerprinting key an integral part of watermarker 123 and to download an encrypted version of watermarker 123 with the digital representation being distributed. The encrypted version is decrypted and installed in secure portion 130 and then does the fingerprint watermarking. Indeed, if watermarker 123 only does fingerprint watermarks and the fingerprint watermark is added immediately upon receipt and decryption of the document, watermarker 123 can be deleted as soon as it has added the fingerprint watermark. It should also be pointed out here that other components of copy client 119(*i*) can be downloaded in the same fashion as watermarker 123, and that part or all of copy client 119(*i*) can also be implemented as a plug-in for a Web browser.

Multi-object Digital Representations in System 101

Figure 3:
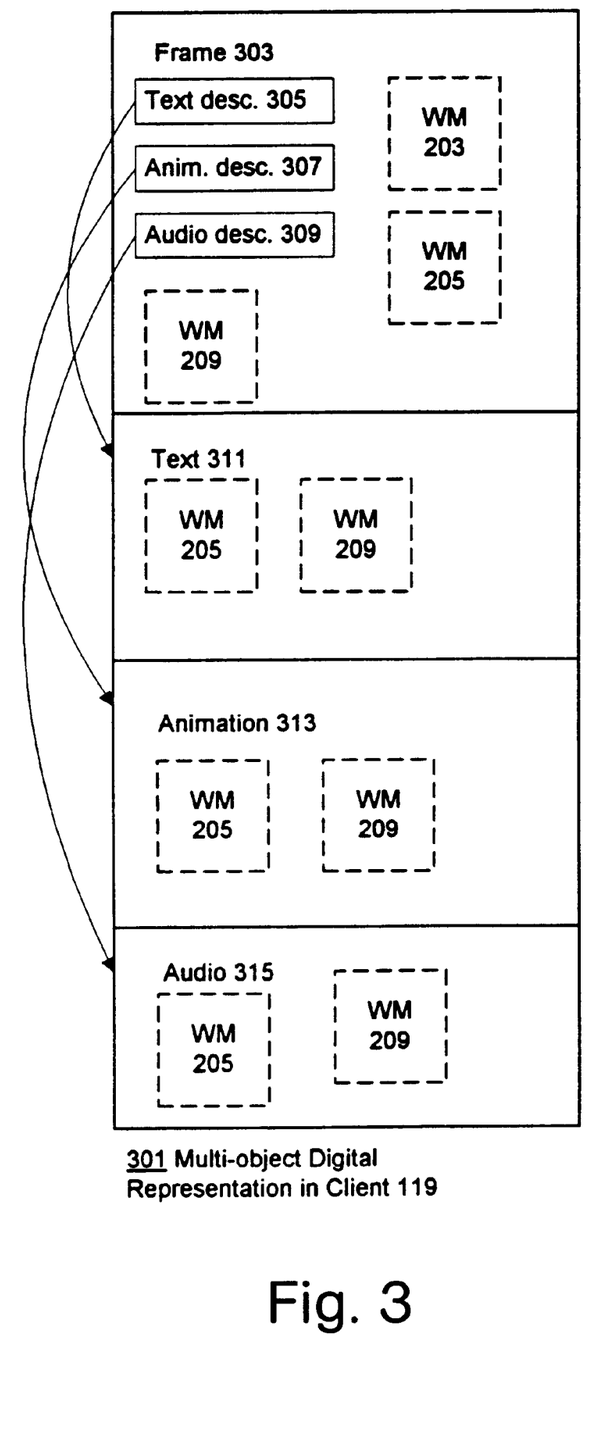
FIG. 3 shows watermarking in a multi-object work.

The work represented by a digital representation may be text or a still or animated picture or an audio recording, but it may also be a combination of these things. A work that is such a combination is termed a multi-media work. The digital representation of such a work is termed a multi-object digital representation, because it includes different digital representations for each of the different components. Such a multi-object digital representation is shown in FIG. 3. Multi-object representation 301 is a representation of a work that consists of text that is accompanied by an animated illustration and an audio sound track for the animated illustration. Representation 301 consists of a frame 303 which contains descriptors 305, 307, and 309 that locate respectively text representation 311, animation representation 313, and audio representation 315. If, as is often the case, text 311, animation 313, and audio 315 have different authors and still another author has combined them as determined in frame 303, there are four different works involved in multi-object digital representation 301, and each of these works may have its own public watermark 203 and secret watermark 205 when the multi-object digital representation is stored in client 119. Before multi-object digital representation 301 is decoded in client 119(*i*) or stored in client storage 133, a fingerprint watermark 209 must additionally be added to each of frame 303, text 311, animation 313, and audio 315.

As long as a user of copy client 119(*i*) deals with a multi-object digital representation in its entirety, the multi-object digital representation is treated in the same fashion as any other digital representation in copy client 119(*i*). When it is stored, it is encrypted in its entirety with the second key provided by copy server 103(*j*). This solution does not work when a user combines digital representations in a new multi-media work. The digital representations being combined may have been received as independent works from copy server 103(*j*), or they may be parts of multi media works for which the user has digital representations.

If the user of copy client 119(*i*) can assemble his own multi-media works, the use limitations must take that possibility into account. For instance, a use limitation on a multi-media work may prohibit copying of a component separately from the entire multi-object representation and/or including the component in a different multi-object representation, and a use limitation on any digital representation may prohibit making the representation or any of its parts into a component of another digital representation. Where the user of copy client 119(*i*) has the right to copy components separately from their multi-object representations or the right to combine digital representations into a new multi-object representation, copy server 103(*j*) must provide symmetric keys for the separate copies and/or for the new multi-object representation. This can be done when the user indicates to copy server 103(*j*) that he or she needs the right to do these things, or it can be done when the user actually makes the separate copies or stores the new multi-object representation in client storage 133. Indeed, some implementations of system 101 may in general provide permissions for various uses of the multi-object representations to the user on an as-requested basis and may provide the encryption keys on an as-needed basis.

Details of Key Management in System 101

As indicated above, symmetric keys are used in system 101 to encrypt digital representations prior to transfer between copy server 103(*j*) and copy client 119(*i*) and prior to storage in client storage 133. While any encryption system could be used, a symmetric key system is used for two reasons:

encryption and decryption is faster with symmetric keys, and speed is of the essence, since the digital representation must be decrypted whenever a user wants to view it.

with symmetric keys, new keys for decrypting and reencrypting a copy of a digital representation are generated for each copy that is distributed, making it possible to relate the keys to the transaction that caused the copy to be distributed.

It is thus possible to maintain a key data base at key generator 111 in copy server 103(*j*) which relates the keys used to encrypt and reencrypt the representation that was copied and the user who ordered the copy and a key data base at 125 in copy client 119(*i*) which relates the keys used to reencrypt the representations to the copy and the user. As pointed out above, the reencryption key may also serve as a user identifier and may be used for that purpose in the fingerprint watermark.

Details of Watermarking

The fundamental principle behind any watermarking system is that any digital representation contains data that is redundant to the information contained in the digital representation and that if the redundant data is modified to produce the watermark, the modification will not be discernible to a user of the digital representation. To take a simple example, every text document contains white space when it is displayed, and the white space can be modified to produce the watermark. Modifications might include moving particular letters or words imperceptibly closer together or farther apart or doing the same with lines. The more complex the thing being represented by the digital representation is, the greater the number and kind of modifications that can be made. Thus, a still image is easier to watermark than a text document and a moving image or an audio recording is easier to watermark than a still image.

Any kind of watermarking technique may be employed in system 101; in a preferred embodiment, however, the watermarking is done using a technique called Randomly Sequenced Pulse Position Modulated Code, which is explained in detail in E. Koch and J. Zhao, "Towards Robust and Hidden Image Copyright Labeling", in: *Proc. Of* 1995 *IEEE Workshop on Nonlinear Signal and Image Processing*, Jun. 20–22, 1995. The advantages of this technique include the following:

- the watermark is embedded at random locations in the digital representation
- the modifications made for the watermark are made in such a fashion that the watermark is not lost if the digital representation is processed or compressed.

The above characteristics make it difficult to find and remove a watermark, make it possible to have hierarchies of watermarks in a document, and make it possible to use the watermark with digital representations such as the JPEG encoding of images and the MPEG encoding of motion pictures which are subject to compression and other processing during transmission.

Conclusion

The foregoing Detailed Description has disclosed how digital watermarking may be combined with encryption to better protect digital representations of works from illegal copying to those skilled in the arts with which the invention is concerned. The inventors have disclosed the best techniques presently known to them for combining watermarking and encryption. It should however be emphasized here that the invention is not dependent on particular encryption or watermarking techniques. More important than the particular encryption techniques or watermarking techniques being employed are the use of watermarking to indicate authorship and/or ownership of documents stored in the copy server and the further use of watermarking to add a fingerprint watermark identifying a recipient of a copy before the copy is decoded or stored in the client. In terms of the principles of the invention, it makes no difference whether the fingerprint watermark is added in the server or the client, as long as no digital representation without a watermark is decoded or stored in the client.

Further, while it is particularly advantageous that watermarking be used in an encryption system which provides a separate encryption key for the copy in the client, there is no requirement that it be so used or that the decryption and encryption keys are distributed in the fashion used in the preferred embodiment. The particular form and/or content of the watermarks and the particular kinds of uses permitted may also vary as required for the particular situations in which the copy client and the copy server must operate.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. Apparatus for manipulating an encrypted digital representation of a work that is received in the apparatus from an external source of digital representations, the apparatus comprising:
    - a manipulator which causes the digital representation to be decrypted and further operated on in response to one or more inputs from a user of the apparatus; and
    - a watermarker which operates in response to the manipulator to receive the decrypted digital representation and watermark the decrypted digital representation with a secret watermark that is received from an external watermark source and that indicates the user of the apparatus, the watermarker watermarking the decrypted digital representation prior to further manipulation thereof.

2. The apparatus set forth in claim 1 wherein:
    the manipulator causes the decrypted digital representation to be further operated on only if the digital representation has the secret watermark.

3. The apparatus set forth in claim 1 wherein:
    the encrypted digital representation is made up of a plurality of digital representations; and
    the watermarker watermarks each of the plurality of digital representations with the secret watermark.

4. The apparatus set forth in any of claims 1, 2, or 3 wherein:
    the manipulator operates interactively in response to the inputs.

5. The apparatus set forth in any of claims 1, 2, or 3 wherein:
    the manipulator causes the decrypted digital representation to be further operated on by causing the decrypted digital representation to be decoded.

6. The apparatus set forth in claim 5 wherein:
    the digital representation and the key are decrypted using another key;
    the apparatus is implemented in a computer system having a protected portion which is inaccessible to the user; and
    the decrypted digital representation and the key and the other key are unavailable outside the protected portion.

7. The apparatus set forth in any of claims 1, 2, or 3 wherein:
    the manipulator causes the decrypted digital representation to be further operated on by causing the decrypted digital representation to be reencrypted using the key and stored in the apparatus.

8. The apparatus set forth in claim 7 wherein:
    the digital representation and the key are decrypted using another key;
    the apparatus is implemented in a computer system having a protected portion which is inaccessible to the user; and
    the decrypted digital representation and the key and the other key are unavailable outside the protected portion.

9. The apparatus set forth in claim 7 wherein:
    the digital representation and the key are decrypted using another key;
    the encrypted digital representation is received in the apparatus in association with the key and the other key; and
    the encrypted digital representation is decrypted with the other key and reencrypted with the key.

10. The apparatus set forth in claim 9 wherein:
    the watermarker makes the secret watermark using the key in the identification of the user of the apparatus.

11. The apparatus set forth in claim 10 wherein:
    the apparatus receives the encrypted digital representation from a distribution source; and
    the apparatus encrypts a copy of the watermarked digital representation and returns the copy to the distribution source.

12. The apparatus set forth in claim 9 wherein:

the manipulator causes the decrypted digital representation to be still further operated on by causing the decrypted digital representation to be modified prior to being reencrypted and stored in the apparatus.

13. The apparatus set forth in claim 12 wherein:

the apparatus receives the encrypted digital representation and the keys associated therewith from a distribution source; and the manipulator causes the modified reencrypted digital representation to be returned to the distribution source.

14. The apparatus set forth in claim 13 wherein:

the watermarker removes all but predetermined ones of the secret watermarks containing identifications before the manipulator causes the modified reencrypted digital representation to be returned to the distribution source.

15. The apparatus set forth in any one of claims 1, 2, or 3 wherein:

the apparatus is a component of a browser.

16. The apparatus set forth in claim 15 wherein:

the watermarker is downloaded to the browser with the digital representation and automatically deleted after watermarking the digital representation.

17. A data storage device characterized in that:

the data storage device contains code which, when executed in a processor, implements the apparatus of any one of claims 1, 2, or 3.

18. The apparatus set forth in any of claims 1, 2, or 3 wherein:

the secret watermark is encrypted; and the watermarker decrypts the secret watermark prior to watermarking the decrypted digital representation.

19. The apparatus set forth in any of claims 1, 2, or 3 wherein:

the watermark source is an external key source and the secret watermark is made using a key from the external key source.

20. The apparatus set forth in claim 19 wherein:

the key is encrypted; and the watermarker decrypts the key prior to watermarking the decrypted digital representation.

21. The apparatus set forth in claim 19 wherein:

the digital representation is decrypted using another key; and the key is decrypted using the other key.

22. Apparatus for preparing a digital representation of a work for downloading to a user having apparatus for decrypting and manipulating the digital representation that includes a watermarker, the apparatus for preparing comprising:

a user identification for the user; and an encrypter for encrypting at least the digital representation such that the apparatus for decrypting and manipulating can decrypt the digital representation, the apparatus for preparing packaging the user identification with the digital representation and the user identification being used in the watermarker to watermark the decrypted digital representation with a secret watermark indicating the identification.

23. The apparatus set forth in claim 22 wherein:

the encrypter receives a first key belonging to the user and employs the key in encrypting the digital representation.

24. The apparatus set forth in claim 22 wherein:

the encrypter further encrypts the user identification.

25. The apparatus set forth in claim 24 wherein:

the encrypter receives a first key belonging to the user and employs the first key to encrypt a second key that the encrypter uses to encrypt the digital representation and the user identification.

26. The apparatus set forth in claim 25 wherein:

the apparatus for preparing packages the encrypted second key and the encrypted user identification with the encrypted digital representation.

27. The apparatus set forth in claim 26 wherein:

the apparatus for preparing receives an indication from the user that the user will perform an operation that involves storing the digital representation and responds thereto by causing the encrypter to encrypt a third key with the first key and the apparatus for preparing packages the encrypted third key with the encrypted second key and the encrypted digital representation, the third key being used by the user to reencrypt the digital representation before the digital representation is stored.

28. The apparatus set forth in claim 27 wherein:

the digital representation of the work for distribution is a digital representation that was stored by the user; and the encrypter uses the third key as the second key in distributing the digital representation.

29. The apparatus set forth in claim 27 wherein:

the watermarker uses the third key as the user identification.

30. A data storage device characterized in that:

the data storage device contains code which, when executed in a processor, implements the apparatus of claim 27.

31. The apparatus set forth in claim 22 wherein:

the apparatus for preparing downloads the watermarker to the apparatus for decrypting and manipulating together with the digital representation.

\* \* \* \* \*